(12) United States Patent  
Brandwine et al.

(10) Patent No.: US 10,346,623 B1  
(45) Date of Patent: Jul. 9, 2019

(54) SERVICE DEFENSE TECHNIQUES

(71) Applicant: Amazon Technologies, Inc., Seattle, WA (US)

(72) Inventors: Eric Jason Brandwine, Haymarket, VA (US); Stephen Edward Schmidt, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/675,347

(22) Filed: Mar. 31, 2015

(51) Int. Cl.
*G06F 21/62* (2013.01)
*G06F 21/50* (2013.01)
*H04L 29/06* (2006.01)

(52) U.S. Cl.
CPC .............. *G06F 21/62* (2013.01); *G06F 21/50* (2013.01); *H04L 63/1491* (2013.01); *G06F 2221/034* (2013.01)

(58) Field of Classification Search
CPC .......... G06F 21/00; G06F 21/62; G06F 21/50; G06F 2221/034; H04L 63/1416
USPC ...................................... 726/1, 23; 707/723
See application file for complete search history.

(56) References Cited

U.S. PATENT DOCUMENTS

| | | | |
|---|---|---|---|
| 8,416,709 B1 * | 4/2013 | Marshall | H04L 41/0806 370/252 |
| 2002/0162015 A1 * | 10/2002 | Tang | G06F 21/565 726/24 |
| 2009/0144810 A1 * | 6/2009 | Gilboy | H04L 63/18 726/5 |
| 2011/0283360 A1 * | 11/2011 | Abadi | H04L 63/1416 726/24 |
| 2012/0042364 A1 * | 2/2012 | Hebert | G06F 21/46 726/6 |
| 2012/0077476 A1 * | 3/2012 | Paraskevakos | G07D 11/30 455/414.2 |
| 2014/0115704 A1 * | 4/2014 | Miller | H04L 63/1416 726/23 |
| 2015/0188941 A1 * | 7/2015 | Boshmaf | H04L 63/1441 726/22 |

OTHER PUBLICATIONS

Roth, G.B., "Flexibly Configurable Data Modification Services," U.S. Appl. No. 13/491,403, filed Jun. 7, 2012.

* cited by examiner

*Primary Examiner* — Abu S Sholeman
(74) *Attorney, Agent, or Firm* — Davis Wright Tremaine LLP (57) ABSTRACT

A computing resource service provider may operate one or more services configured to provide customers with access to computing resources. Attackers may attempt to exfiltrate customer data from the one or more services. In order to prevent attackers from obtaining customer data the one or more services may provide specious data in response to an attack. The attack may be detected based at least in part on a set of triggers that indicate a likelihood of attack. The specious data may be configured to appear to the attacker as authentic customer data and/or that the attack is successful. Additionally, the specious data may be detectable by the one or more service, enabling the one or more service to collect additional data corresponding to the attack and/or attacker.

19 Claims, 8 Drawing Sheets

SERVICE DEFENSE TECHNIQUES

BACKGROUND

Computer systems can become subject to attacks, where an unauthorized party attempts to gain access to data stored by a computer system. An attacker may seek to obtain data to be exfiltrated and used to the attacker's benefit. Attacks may target financial data, such as credit card numbers, or the attacks may be part of an industrial espionage operation, where trade secrets, design documents or specifications may be retrieved. Attacks on computer systems present challenges to operators of computer systems whereby, despite advances in data security, the attacks still occur with alarming frequency. Furthermore, these attacks, even when unsuccessful, have adverse economic impacts on individuals and organizations alike. The attacks can force organizations to suspend their operations for periods of time. In addition, attacks directed towards identity theft or the financial information of an organization's customers may be very costly to the organizations.

It is challenging to protect data stored in a data storage system or other service. Furthermore, it is also challenging to protect that data while ensuring uninterrupted access to the data by parties having an authorization to access the data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to protecting various services of a computing resource service provider, such as data vending services and other services that may maintain customer data. Access to the customer data maintained by the various services may be limited to parties, such as users, who have a privilege to access the customer data. For example, access to data maintained by a data storage service may be governed by an access policy that dictates an access privilege required to obtain the data or cause the data to be retrieved from the data store. The data storage service may be breached in the unlikely event that an attacker defeats security measures already in place. During an attack, the breaching party lacking a privilege to access the data store, such as an attacker, may be able to retrieve data from the data store. In the event of an attack, the various services may provide specious data in response to the attacker. The specious data may appear to the attacker as customer data, but may in fact be fake data or other data generated to have the appearance of customer data.

Various triggers may initiate the generation and transmission of specious data in response to an attack or request associated with an attack. For example, authentication of a particular request may succeed, but authorization may fail (e.g., the requestor has authenticated itself and perhaps has access to the service and/or data maintained by the service, but does not have access to the particular data object included in the request). As another example of a trigger, a particular request may be determined to be malformed or otherwise not expected, and therefore indicative of an attack (e.g., a query that is broader or more frequent than queries that are generally received by the service). Once a query has been determined to be malformed, a Levenshtein distance between the elements of the query and a dictionary or elements of a previous submitted query may be used to determine a type of specious data to be provided in response to the specious query. For example, if the query contains a misspelled word, the Levenshtein distance may be used to determine what data the requestor was attempting to query for and provide specious data of that type. Various complexity levels may be applied to the triggers, allowing for greater flexibility when determining an attack is in progress and providing a response to the attack. For example, a certain number of anomalous queries may be permitted before specious data is provided in response to the queries. Additionally, a certain percentage of data provided in response to a request and/or query may be specious data. For example, for the first 10 anomalous queries, zero percent of the response data may be specious, then for every anomalous query beyond 10, the percentage of specious data returned in response to the query nay be increased.

In addition to providing specious data, the various services may perform other operations to mitigate attacks. For example, the various services may use tarpiting techniques to delay attackers. A "tar pit" may be a computer system operated by a service, such as the data storage service, or another of the computing resource service provider configured to purposefully delay incoming connections and responses. The delay may be configured to enable the greatest amount of time to elapse before transmitting a response without resulting in the connection being lost and/or dropped as a result of the delay. The various services may also use Data Loss Prevention (DLP) techniques to detect specious data and mitigate attacks on the various services. For example, the data in IP or TCP packets may be inspected for data of certain types of specious data, such as credit card numbers, social security numbers, IP addresses, e-mail addresses, customer account numbers, and/or any other types of specious data that may have been provided by a particular service in response to a potential attack. The specious data may be generated to have one or more distinguishing attributes in order to enable detection of the specious data.

The specious data may be generated based at least in part on a grammar or other set of rules defining various attributes of the specious data. A grammar may be a set of rules for generation strings or other sets of characters from an alphabet in a formal language. The rules may describe how to form strings from the alphabet of the language that are valid according to a syntax for the language. The grammar may not describe the meaning of the strings but provide a set of rules for generating a string that may have meaning in the language. For example, the specious data may include credit card numbers generated based at least in part on a grammar configured such that the credit card numbers pass a Luhn check, described in greater detail below. Additionally, the various services may determine a particular grammar based at least in part on the data maintained by the service. For example, the service may maintain customer address information and determine, based at least in part on the customer address information, a grammar for generating specious address information to provide in response to an attack. Additionally, a customer of the service may provide a grammar for generating specious data or may provide specious data directly to the service. For example, the customer may generate specious data based at least in part on customer data by changing elements of the customer data, such as addresses and names, such that the data appears legitimate but is in fact not actual customer data.

Figure 1:
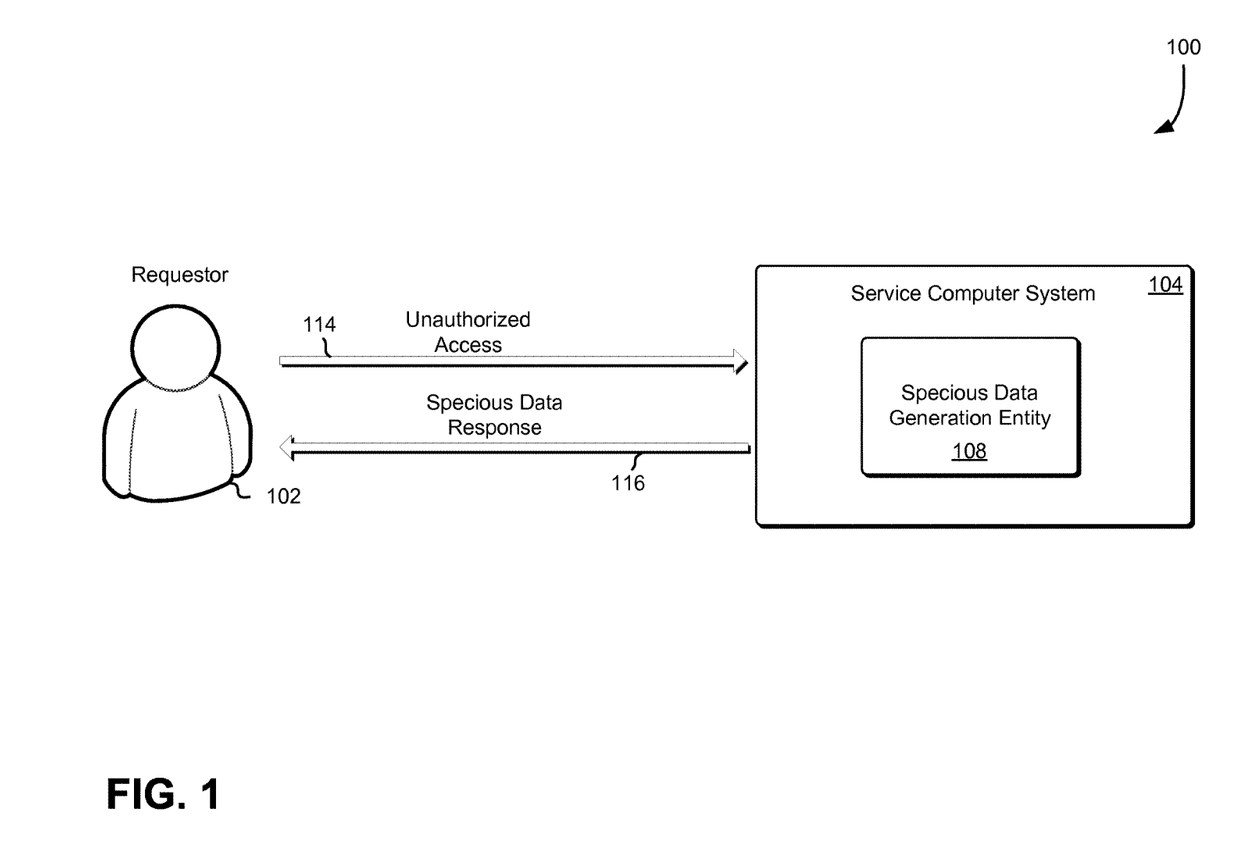
FIG. 1 shows an example of an environment for protecting a service by providing specious data in response to an unauthorized request to access data in accordance with an embodiment.

FIG. 1 shows an example of an environment 100 for protecting a service by providing specious data in response to an unauthorized request to access data in accordance with an embodiment. A service computer system 104 may be configured to receive request and return data in response to received requests. For example, the service computer system 104 may be a component of, or configured to implement, a data storage service including a data store, an interface, and one or more storage devices, such as a hard drive or a solid state drive. The interface may receive requests and return data from the data store in response to the request. Further, data stored by the data storage system 104 may comprise a plurality of data sets and data records. The data sets may, for example, be a database table and a record may be a row or column of the table. A requestor 102 is shown in FIG. 1. The requestor 102 may be a computer system that communicates with the data storage system 104 by, for example, sending requests to access data stored by the service computer system 104. The requestor 102 may operate in an automated fashion and/or in connection with user input provided to an input device. The requestor 102 may be a legitimate user of the service computer system 104 and may have an authorization that grants the requestor 102 access to the service computer system 104. Furthermore, the requestor 102 may not be a legitimate user of the service computer system 104. For example, the service computer system 104 may be breached and an attacker that does not have an authorization permitting retrieval of data from the service computer system 104.

If breach of the data storage system 104 is detected, a specious data generation entity 108 may generate specious data, which may be provided in a specious data response 116 to the unauthorized access 114 by the requestor 102. The specious data generation entity 108 may comprise various computing resources configured to generate and determine specious data in response to a detected breach. The specious data generation entity 108 may contain logic configured according to a grammar. The grammar may be configured to generate data that appears valid and/or authentic but is not actual data maintained by the service computer system 104. Additionally, the specious data generation entity 108 may generate specious data based at least in part on a set of expected attributes of the data. For example, an expected attribute of the data may include a number X characters long, where X is a value between 8 and 10. In another example, the expected attributes of an address may include a number, a name, and a second number 5 digits long. The specious data may then be generated to share at least a portion of the expected attributes.

For example, the unauthorized access 114 may include a query, from the requestor 102, for all the credit card numbers included in a database maintained by the service computer system 104. The requestor 102 may have authenticated the unauthorized access 114 to the computer service system 104, but may not have authorization to retrieve credit card numbers from the database. In response to this breach, the specious generation entity 108 may generate credit card numbers based at least in part on a grammar configured to generate random numbers that pass the Luhn check, described in greater detail below. The generated specious data may then be provided in a specious data response 116, which may cause the requestor 102 to determine that they have successfully exfiltrated customer data from the service computer system 104.

Generating the specious data may depend on the type or structure of the requested data. For example, if the requested data include addresses, publicly available databases including addresses may be used to generate at least a portion of the specious data. In another example, if the requested data is names of individuals, publicly available databases including the popularity associated with first names and last names in geographic regions may be consulted. The specious data may be generated by selecting first names and last names from the database and pairing the names (for example, randomly) to form an individual's names. The selection of the names may be biased, based at least in part on the popularity of the name within a region such that more popular names are more likely to be selected than less popular names. Returning to the previous example, if the requested data are street or mailing addresses, publicly available databases including street names and building numbers may be used to form an authentic-looking address. The address may then be paired with an appropriate city and zip code to form the address. In addition, fictitious email addresses may also be generated. The fictitious email address may be an address for which the service computer system 104 or the computing resource service provider operating the service computer system 104 controls the mail exchanger record (MX record) for. This may enable the computing resource service provider to trace the specious data when performing DLP operations, described in greater detail below.

Furthermore, if the requested data is a government ID number or a payment instrument number (such as a credit card number or a gift card code), the numbers or codes may be randomly or pseudo-randomly generated based at least in part on a grammar. The fabricated numbers or codes may be filtered to ensure that they pass an appropriate validity check (such as the Luhn check for credit card numbers) to ensure that they are not easily filtered by an attacker. The Luhn check may be a simple checksum formula used to validate a variety of identification numbers, such as credit card numbers, International Mobile Station Equipment Identity numbers, National Provider Identifier numbers in US and Canadian Social Insurance Numbers. It is noted that even if a randomly generated credit card number passes the Luhn check, the credit card number may still not be valid. Even if the number is valid, the credit card number may not be used as a payment instrument unless other criteria are satisfied. The other criteria may include a proper expiration data or associated zip code, which, if also randomly generated, are highly improbable to make the credit card number valid as a payment instrument. Furthermore, records on the credit card numbers or gift card may be maintained by the service computer system 104 in order to enable detection of the specious data provided to the requestor 102. For example, if the requestor attempts to use the specious credit card numbers provided in response to the unauthorized access 114.

If the data sought to be imitated is behavioral data, such as browse or purchase history, a recommendations engine included in the specious data generation entity 108 may be used to generate the specious data. The recommendations engine may be seeded with a randomly selected data point, such as a popular webpage address or a popularly purchased item, to generate the forged behavioral data. Furthermore, if the data is medical data including standardized codes for diagnoses and procedures, the codes may be generated randomly or using a training algorithm. A training algorithm may also be used to determine a grammar to generate specious data. The training algorithm may be seeded with customer data maintained by the service computer system 104 in order to generate the grammar.

Fabricated text data, such as that generated for specifications, design documents or books, may be generated by training a Markov chain using the genuine text. Generation using a Markov chain is advantageous in that the size of the generated text will likely be much greater than the genuine text. Markov chain may include a random process that undergoes transitions from one state to another on a state. The process may be characterized as "memoryless" (e.g., the probability distribution of the next state depends only on the current state and not on the sequence of events that preceded it). Furthermore, forgeries of digital content, such as audio or video files, may be randomly generated. In addition, geolocation data may be generated to appear plausible. For example, routes to popular destinations, such as restaurants, stores, arenas or museums in the vicinity of a fictitious address may be generated. The geolocation data associated with an address may be generated based at least in part on seeding the fictitious address to a generation algorithm in order to give the geolocation data an authentic appearance.

Figure 2:
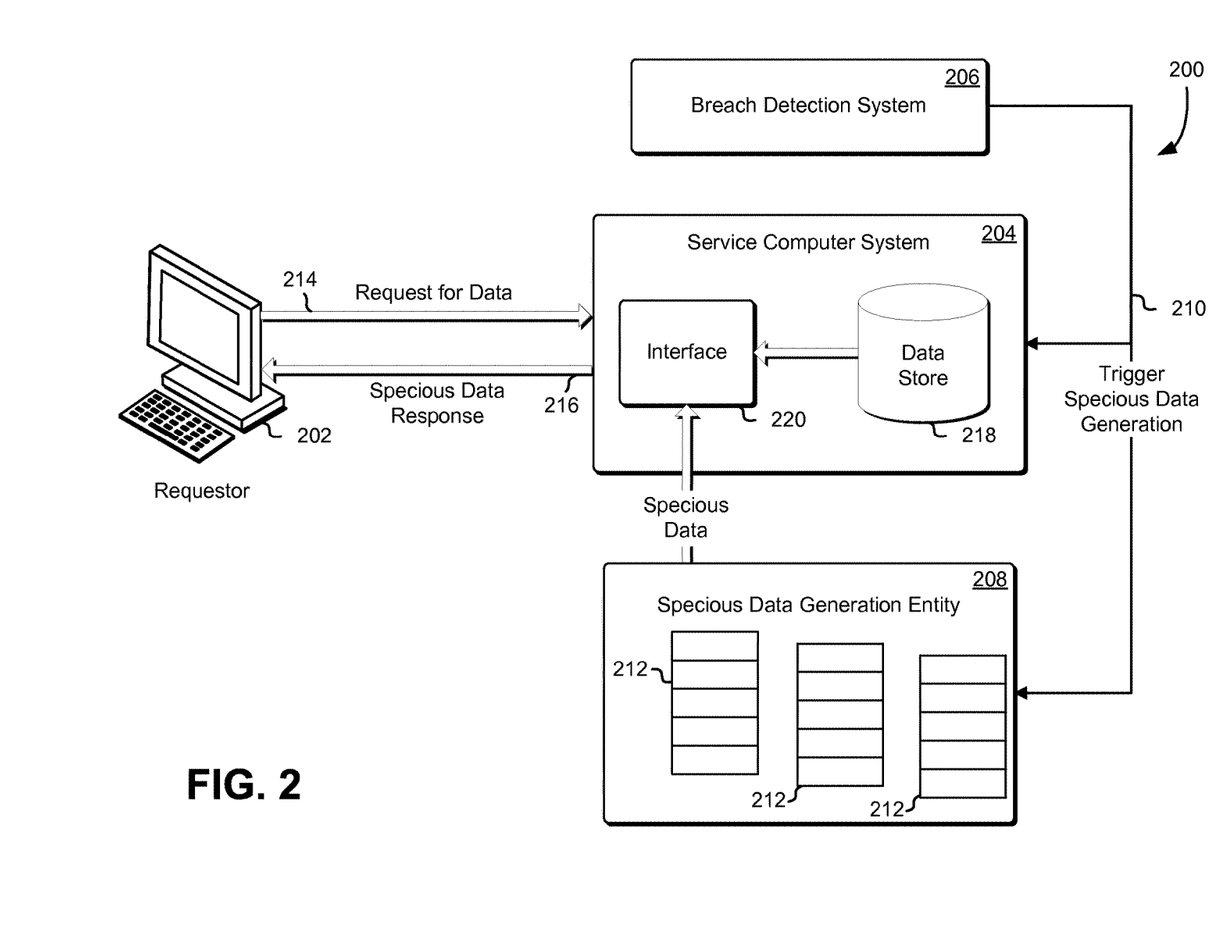
FIG. 2 shows an example of an environment for providing specious data in response to an unauthorized request to access data in accordance with an embodiment.

FIG. 2 shows an example of an environment for providing specious data in response to an unauthorized request to access data in accordance with an embodiment. In the environment 200, a requestor 202, service computer system 204, breach detection system 206 and specious data generation entity 208 are shown. The service computer system 204 may be any type of system configured to store data or provide the data in response to a request for access to the data. The service computer system 204 may, in various embodiments, include a database or file storage system. In addition, the service computer system 204 may be any type of data vending system, whereby the data vending system may receive requests for data and provide data in response to the requests. The data vended by the data vending system may be retrieved from an associated data store or dynamically generated (for example, in response to the request), among others. Furthermore, the service computer system 204 may be remotely accessible by the requestor 202 via a network (not shown in FIG. 2 for simplicity), whereby the network may be a public network, such as the Internet, or a private network, such as an intranet. The service computer system 204 may include one or more computing resources, such as storage devices, servers or networking equipment including routers. The one or more computing resources may be configured (for example, collectively) to receive requests, at an interface 220, for accessing the data from one or more entities, including the requestor 202, and provide the requested data as well as specious data in response to the request as described herein. The service computer system 204 may be a database service in a multi-tenant environment. The service computer system 204 may be used to store data pertaining to a plurality of customers and the data may be accessible to the customers who may make requests to access the data from the service computer system 204 and retrieve the data in response to the request.

The service computer system 204 may further be dedicated to store data pertaining to a single organization. The organization may be a health care provider, a retailer (such as an ecommerce retailer), a financial services organization, or a social media service provider, among many others. The service computer system 204 may store data that is sought to be provided and exploited by attackers, such as specious credit card numbers or e-mail address. In the unlikely event that an attacker defeats security measures already in place, attackers may attempt to exploit the data to their benefit. An attack may include requests and other interactions with data that is detrimental to an entity associated with the data. The entity may include an owner of the data, a customer of the computing resource service provider, another service of the computing resource service provider, or other entity or organization responsible for the data.

The data may include trade secrets, design documents, medical data or sales data, among others. Furthermore, if the organization maintains records about its customers, the records may be sought to be exploited. Personally identifiable information (PII), including names, contact information and government identification (ID) numbers and information about payment instruments, including credit card numbers, gift card numbers or bank account information, may also be subject to exploitation by attackers. In addition, the organization may provide social media services to customers, or may be an ecommerce retailer. The organization may maintain browsing history, "click stream" data or purchase history of the customers, among others, and attackers may seek to obtain the data. In another example, the organization may sell media, including ebooks or downloadable music, movies, television series, or device applications. Attackers may attempt to obtain the organization's library of media. Furthermore, financial data including sales volumes or profits may also be exploited.

A breach detection system 206 of the environment 200 may detect that the data storage system is subject to an attack or is likely to be subject to an attack. For example, a system may be breached if a malicious user has gained access to the system, whereby the malicious user may pose as a legitimate user. In another example, a system may be breached if the malicious user has been authenticated to the system, but is attempting to perform operations that the malicious user in not authorized to perform. The breach detection system 206 may also monitor interactions with the service computer system 204 and determine a set of standard interactions that are authorized. Based at least in part on the set of standard interactions, the breach detection system 206 may detect an attack as a result of a particular attempted interaction that is not a member of the set of standard interactions. The breach detection system 206 may identify the attacker, for example, by an identity used by the attacker. For example, a set of frequently submitted queries to a data based may be generated and a query submitted that does not match the set of frequently submitted queries may be considered malformed, and therefore associated with an attack.

The service computer system 204 may accept queries according to a particular syntax. The syntax defines a set of characteristics of well-formed queries and queries violating the syntax may be considered malformed. For example, a malformed query could include an invalid operation or an incorrect identifier for a type of data object such as an incorrect table name or column name for a database. Additionally, queries may be malformed based at least in part on errors included in the query. For example, a query may be malformed as a result of a field being misspelled or mislabeled in the query. The service computer system 204 or component thereof may then match the malformed parameters of the query to well-formed parameters have the shortest Levenshtein distance. The breach detection system 206 may only identify that an attack is occurring, but may not identify the source of the attack or an identity used by the attacker to gain access to the service computer system 204. Malformed queries may also include queries that queries that are broader or more frequent than a set of acceptable queries defined by the service computer system 204. For example, the query may request a larger amount of data, may be submitted with a greater frequency, or may request two or more data objects that are rarely request together.

In various embodiments, it may be undesirable to disable the vending of data from the data storage system in response to breach detection. Disabling the retrieval of data from the data service computer system 204 may disrupt the operation of the organization. For example, an ecommerce retailer may be unable to serve its customers, or its service to customers may be hindered due to disabling the retrieval of data from the service computer system 204. Furthermore, if an identity of an attacker is identified, it may be desirable not to immediately disable the attacker's access to the service computer system 204, as that would deny the opportunity to study the attacker or to learn a profile of the attacker, including the techniques used by the attacker to infiltrate or breach the service computer system 204. Furthermore, disabling the system may alarm or fend off the attacker, which may result in losing an opportunity to track the attacker or an origin of the attacker, or cause the attacker to find a more fruitful way to breach the system.

In the unlikely event that an attacker defeats security measures already in place, the breach detection system 206 detects a data breach. While actively determining how to stop the breach and terminate an attacker's access, specious data generation may be performed. Upon detecting a breach, the breach detection system 206 sends a trigger 210 of the breach to the service computer system 204 or to the specious data generation entity 208. The trigger 210 may be an electronic message containing instructions to perform specious data generation. In various embodiments, the specious data is previously generated and the trigger contains instructions to package or otherwise prepare the specious data for transmission to the requestor 202.

Receipt of the trigger 210 by the service computer system 204 or the specious data generation entity 208 may cause the specious data generation entity 208 to generate specious data 212. The specious data 212 may be provided in a response 216 to a request 214 for data by the requestor 202. The specious data 212 may be provided together with data retrieved from a data store 218 of the service computer system 204. For example, the response 216 may include specious data 212 and authenticate customer data 218, such as specious credit card numbers and actual customer numbers. The retrieved data is responsive to the request 214, and providing the retrieved data in response to the request 214 may fulfill the request 214. The combination of the specious data 212 and responsive data may convince the attacker that the attack succeeded and render the retrieved data unusable. For example, if the ratio of responsive data to specious data 212 is on the order of one thousand to one, it will be improbable that a randomly selected data record from the combination of the responsive data and specious data 212 will be real. Furthermore, the specious data generation entity 208 may generate detectable specious data 212. The detectable specious data 211 may be detected as specious data provided in response to potential attack by the service computer system 204 or other service, described in greater detail below.

In various embodiments, the specious data generation entity 204 or other component of the service computer system 204, such as the breach detection system 206, maintains state information corresponding to the specious data provided in the response 216. For example, the specious data generation entity 204 may maintain state information to ensure that the same or similar requests for data 214 receive the same specious data in response. A request may be considered the same or similar based at least in part on the data to be returned in response to the request. For example, if the response to the request may return the same customer's address, the request may be considered that same or similar. In this way an attacker may be continuously fooled or may be prevented from determining that specious information is being provided in response to the attackers request for data 214. Specifically, if a first attacker requests address information for a subset of customers of the service, the specious data generation entity 208 may generate the requested address information according to a grammar as described above and records state information indicating the specious address information generated for the subset of customers. At some point in time later, a second attacker may request address information for the subset of customers or a portion of the subset of customers and in response the specious data generation entity may use the state information to return in response to the request the same specious address information corresponding to the subset of customer addresses as provided to the first attack. The state information may include any information useable to identify particular specious data that was returned in response to a previous request, thereby enabling the service computer system 304 to provide data that is, in some or all respects, consistent (i.e., not conflicting) with specious data that was previously provided.

The specious data generation or other component of the service computer system 204 maintaining the state information may store the state information in the data store 218. In various embodiments, a seed value is used to generate the specious data, in these embodiments the same seed is used to generate and re-generate specious data for the same or similar request for data 214. By using the same seed value the specious data generation entity 208 may ensure that the same specious data is provided to requestors 202 for the same request or queries. The specious entity 208 may store responses 216 including specious data, when a request 214 is received at the interface 220 the specious data generation entity 208 may determine if a previously stored specious data response 216 or portion thereof may satisfy the request 214.

Figure 3:
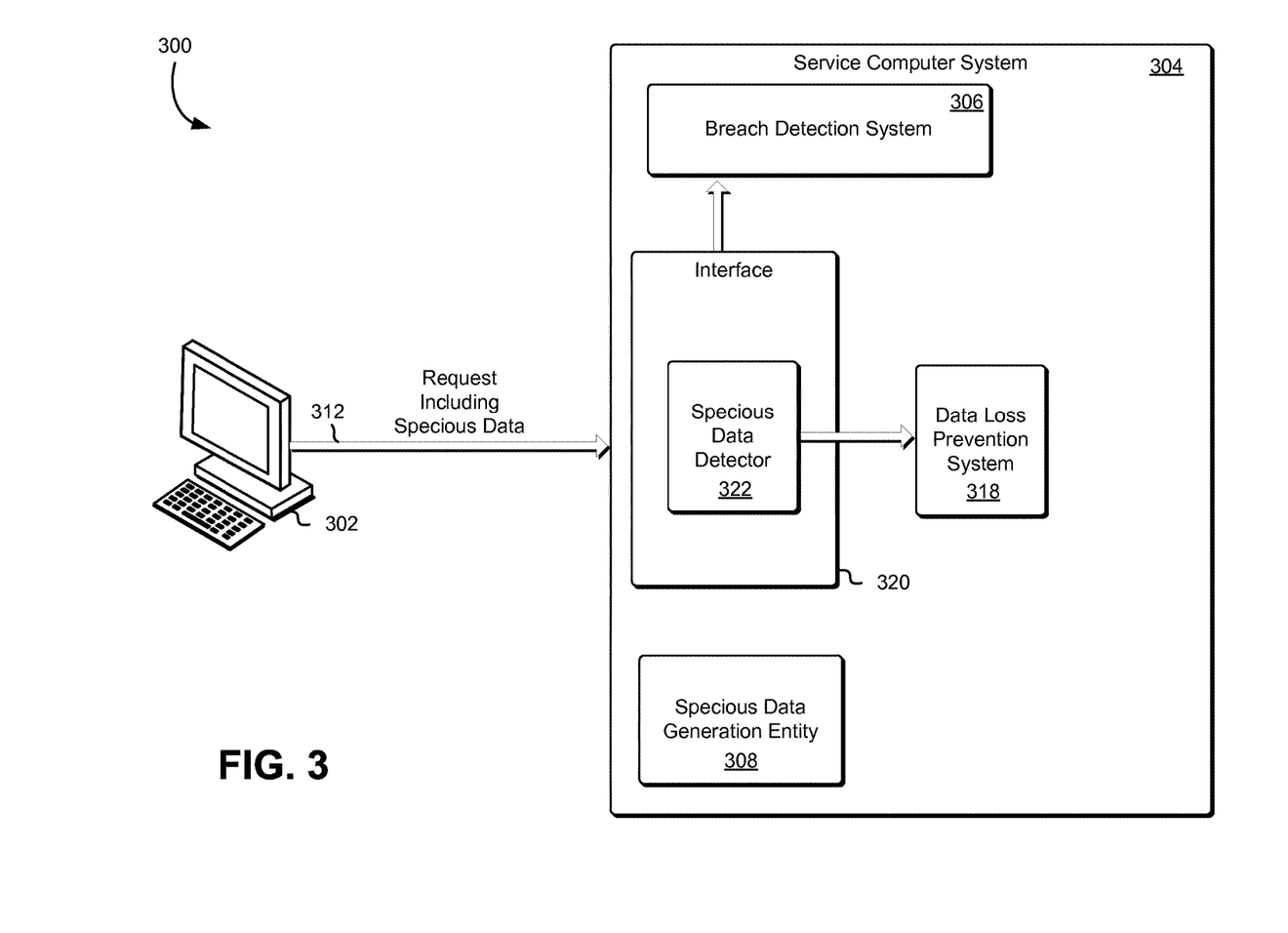
FIG. 3 shows an example of an environment for detecting specious data included in a request to access data in accordance with an embodiment.

FIG. 3 shows an example of an environment for detecting specious data included in a request to access data in accordance with an embodiment. In the environment 300, a requestor 302, service computer system 304, breach detection system 306 and specious data generation 308, specious data detector 322, and data loss prevention system 318 are shown. The service computer system 204 may be any type of system as described above in connection with FIG. 2. The requestor 302 may be an entity that has previous obtained specious data from the service computer system 304 or other computer system. For example, the requestor 302 may be an attacker who previously obtained specious data as a result of providing an unauthorized request to the service computer system 304, as described above in connection with FIG. 2. Alternatively, the requestor 302 may have obtained the specious data in an attack to another service of the computing resource service provider. For example, the requestor 302 may have obtained credit card numbers from a database service and is attempting to provide a purchase request to an online retailer including the specious credit card numbers.

The requestor 302 may transmit a request including specious data to the interface 320 of the service computer system 304. In various embodiments, the interface 320 includes the specious data detector 322 configured to detect specious data included in the request 312, and cause various data loss prevention operations to be performed as a result of detecting the specious data included in the request 312. For example, the specious data detector may analyze network traffic received at the interface 320 with respect to one or more DLP policy criteria. DLP policy criteria may include those discussed in U.S. Pat. No. 8,416,709. For example, data in IP or TCP packets may be inspected for data of certain data types, such as credit card numbers, social security numbers, and/or any other types of data that may be specious data generated by the specious data generation entity 308. A determination may be made as to whether the DLP's criteria are satisfied. The DLP criteria may be generated and maintained by the data loss prevention system 318.

The specious data detector 322 may require multiple instances of specious data detection before alerting the breach detection system 306 or data loss prevention system 318 of the inclusion of specious data in a request or a possible attack on the service computer system 304. Additionally, the specious data generation entity 308 may generate specious data including homoglyphs in order to fool an attacker while enabling the specious data detector 322 to determine the data include in a request is specious. A homoglyph may be one of two or more graphemes, characters, or glyphs with shapes or appearance that may either appear identical or cannot be differentiated by quick visual inspection. For example, the Unicode (RTM) character set contains many strongly homogliphic characters, such as the Greek letter 'A,' the Cyrillic letter 'A,' and the Latin letter 'A.' These letter may be visually identical but have a different Unicode (RTM) encoding. Therefore, the specious data generation entity 308 may, for example, generate specious data using the Greek or Cyrillic letter 'A' in place of the Latin letter 'A.' When the specious data detector 322 detects the Unicode (RTM) encoding for the Greek or Cyrillic letter 'A', the specious data detector 322 may indicate to the breach detection system 306 and/or data loss prevention system 318 that the request 312 includes specious data and may be part of an attack.

If it is determined that the DLP criteria are satisfied, various mitigating actions may be performed, including updating the breach detection system 306 with information corresponding to the requestor 302, such as an IP address or MAC address, blocking the requested access, or tracing the request. Additional actions may include, but are not limited to, snapshotting, i.e., copying, the network traffic that was received and persisting the snapshot in a data storage service, such as the backing service or another data storage service performing packet tracing, performing a quarantine of the network traffic that was received, initiating enhanced logging of network traffic, and/or denial of the action. Generally, any type of action configured to address DLP concerns may be used. In addition, the actions that are taken when a DLP or other policy criteria are satisfied may be configurable by a customer. Generally, data may be manipulated in accordance with customer specifications utilizing techniques such as those described in U.S. patent application Ser. No. 13/491,403, filed on Jun. 7, 2012, entitled "FLEXIBLY CONFIGURABLE DATA MODIFICATION SERVICES," which is incorporated herein by reference. As discussed above, various variations are considered as being within the scope of the present disclosure, including processing the request despite the specious data when DLP criteria are satisfied. Additional actions may be taken in addition to or as an alternative to encryption of the data.

Figure 4:
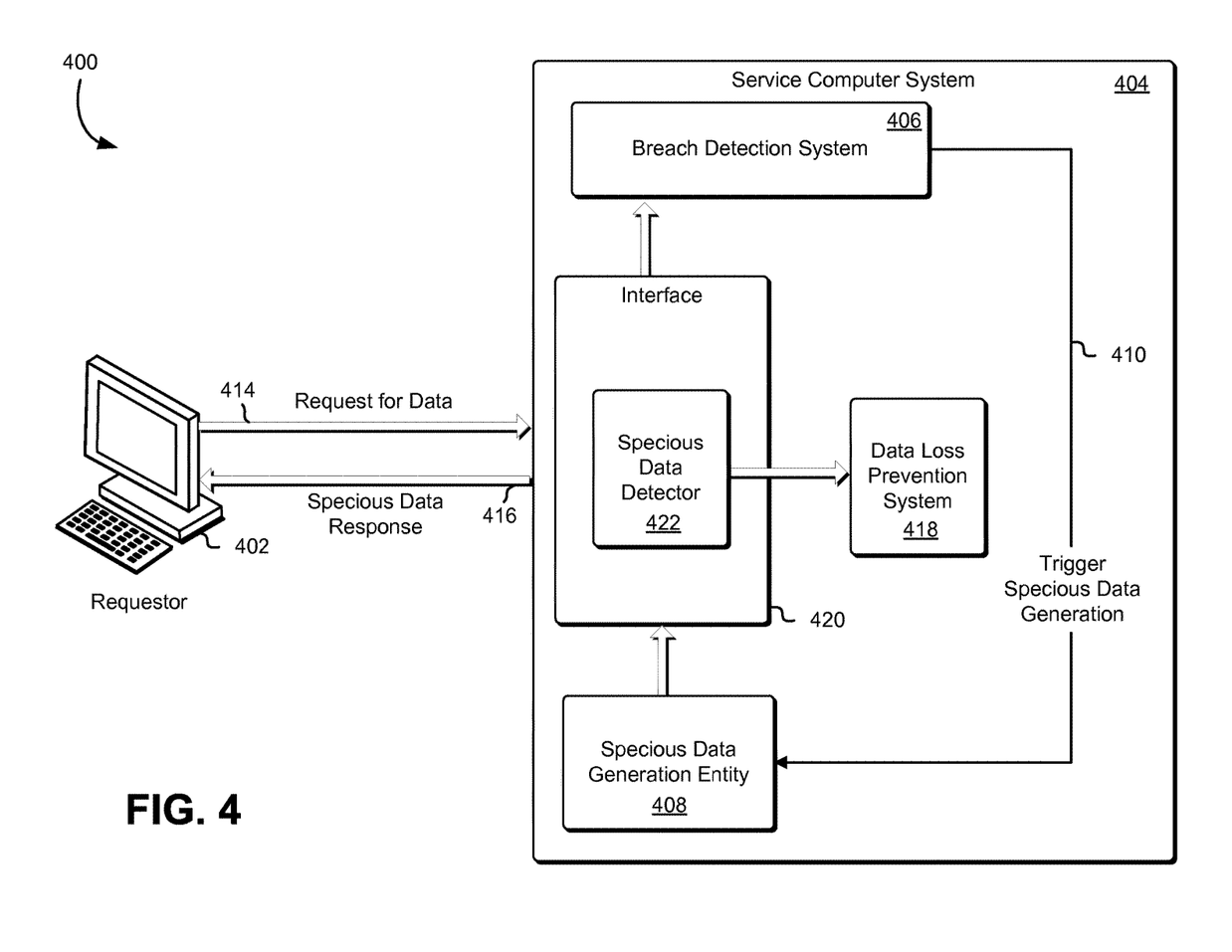
FIG. 4 shows an example of an environment for detecting specious data included in a response to an unauthorized request to access data in accordance with an embodiment.

FIG. 4 shows an example of an environment for detecting specious data included in a response to an unauthorized request for access to data in accordance with an embodiment. In the environment 400, a requestor 402, service computer system 404, breach detection system 406, specious data generation 408, specious data detector 422, and data loss prevention system 418 are shown. The service computer system 404 may be any type of system as described above in connection with FIG. 2. As illustrated by FIG. 4, the requestor 414 may provide the service computer system 404 with a request for data 414. The request for data 414 may cause the breach detection system 406 to detect an attack based at least in part on the request for data 414. An attack may be detected based on a variety of different attributes of the request 414, such as an IP address or MAC address associated with the request 414, a customer account associated with the request 414, credentials associated with the request 414, information included in the request such as specious data or a malformed query (as described above), an unauthorized request, or any other attribute indicating a likelihood of the request 414 being associated with an attack.

If the breach detection system determines that the request 414 is associated with an attack, a trigger 410 may be provided to the specious data generation entity 408. Receipt of the trigger 410 by the service computer system 404 or the specious data generation entity 408 may cause the specious data generation entity 408 to generate specious data. The specious data may be provided in a response 416 to a request 414 by the requestor 402. The specious data may be provided together with data retrieved from a data store of the computer service system 204 as described above. The specious data detector 422 may detect the specious data provided in the response 416. The specious data detector may then provide an indication to the data loss prevention system 418 that specious data have been included in a request.

The data loss prevention system 418 may then perform various operations in order to mitigate the attack. For example, the data loss prevention system may encrypt or otherwise modify any non-specious data included in the request, such as customer data. In various embodiments, the specious data detector 422 is integrated with various networking components such as routers and switches operated by the service computer system 404, or computing resource service provider. In such embodiments, the specious data detector 422 can detect specious data included in IP packets or TCP packets as the packets travel over the computing resource service provider network. Additionally, if the specious data detector 422 detects specious data in a request or in IP packets, information corresponding to the request or IP packs may be used to update the breach detection system, discussed in greater detail below.

Figure 5:
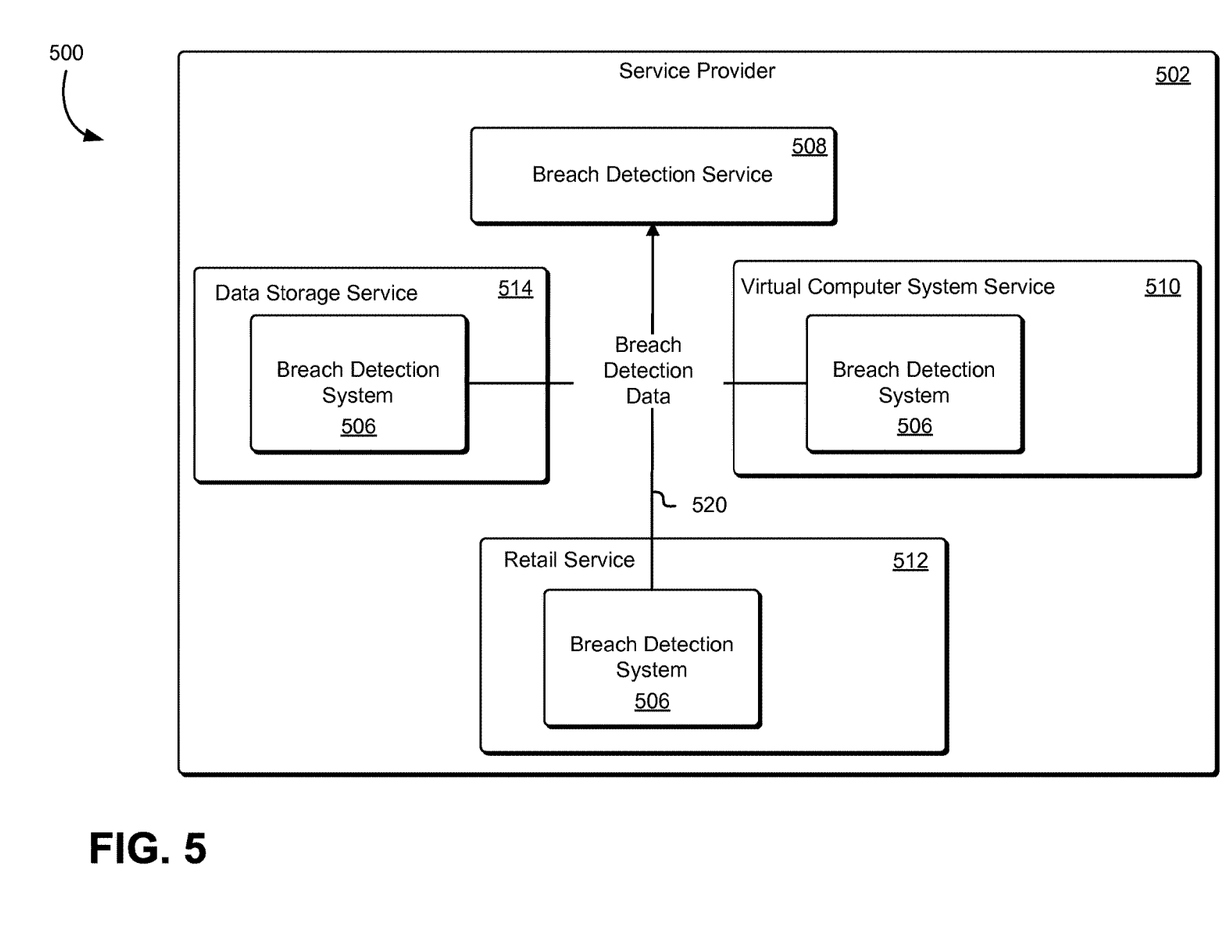
FIG. 5 shows an example of an environment in which a breach detection system receives updates to breach detection data from various services in accordance with an embodiment.

FIG. 5 shows an example of an environment 500 in which a breach detection system receives updates to breach detection data from various services in accordance with an embodiment. As illustrated by FIG. 5, a service provider 502 may operate various services, such as a data storage service 514, a virtual computer system service 510, a retail service 512, and a breach detection service 508. Each service may have an entity, such as the breach detection system 506 described with reference to FIG. 2, which detects a breach affecting the service. The breach may be detected due to an unauthorized user (such as a hacker) gaining access to the data storage system. An identity used by the attacker may be known or identified by the breach detection system 506, or the attacker may be anonymous. In response to detecting the breach, the breach detection system 506 may provide an indication of the detected breach to the one or more services, the breach detection service 508, or a specious data generation entity corresponding to the service, such as the specious data generation entity described above in connection with FIG. 2.

In various embodiments, the services receive, from a requestor, a request to interact with the service. The request to interact with the service may be received following breach detection by the breach detection system 506 or the breach detection service. For example, each service may have an interface or other component configured to receive network traffic and detect breaches based at least in part on the received network traffic. Alternatively, service provider 502 may operate a single interface or component of the breach detection service responsible for detecting breaches. The request may be a database query, among others, and may identify the data sought to be retrieved or may specify one or more criteria for the request. The request may be fulfilled by providing one or more data records that are identified by the request or that meet the one or more criteria.

In addition, the request may be an application programming interface (API) function call made to the data storage system or an interface thereof, such as the interface described with reference to FIG. 2. It is noted that in various embodiments, the requested data may be dynamically generated and may not be stored by the services. Furthermore, the request may be any type of query, such as a database query, and data that is responsive to the request may meet criteria specified in the query. Depending on the request, the data responsive to the request may be a single data entry, such as a database table entry, or a plurality of entries, such as the entire database. For example, the request for data may be a request to retrieve the names and address associated with customer accounts for an organization, or only accounts of customers that meet certain criteria. In the case of a breach, the specious data generation entity, as described above, then generates specious data in response to detecting the breach and receiving the request to interact with the service. The specious data may preferably be fictitious, yet imitative of the request and likely to be perceived as genuine (for example, by an attacker).

The service may then provide the specious data in response to the request. In addition to providing the specious data, the service may also provide breach detection data 520 to the breach detection service 508. The breach detection service 508 may be a collection of computing resources operated by the service provider 502 configured to generate information capable of detecting breaches and other attacks on the various service providers and/or information capable of identifying attackers. In various embodiments, the breach detection system may provide DLP services as described above. The breach detection data 520 may include information to identify a requestor, a type of request and/or query submitted, date and time information of the detect breach, information requested, or any other attribute of the detected breach suitable for updating the breach detection service 508. For example, the breach detection data 520 may include an IP address of the requestor. The breach detecting information 520 may be correlated by the breach detection service 508 between the various services, allowing the service provider 502 to discover attack behavior across various services.

The various services may also provide the breach detection service 508 with breach detection data 520 as a result of detecting specious data included in a request, as described above in connection with FIG. 4. For example, the retail service 512 may detect specious credit card information in a request and provide breach detection data 520 corresponding to the request to the breach detection service 508. In various embodiments, the specious data may have been generated by another service of the service provider 502, such as the virtual computer system service 510 or data storage service as illustrated in FIG. 5.

Figure 6:
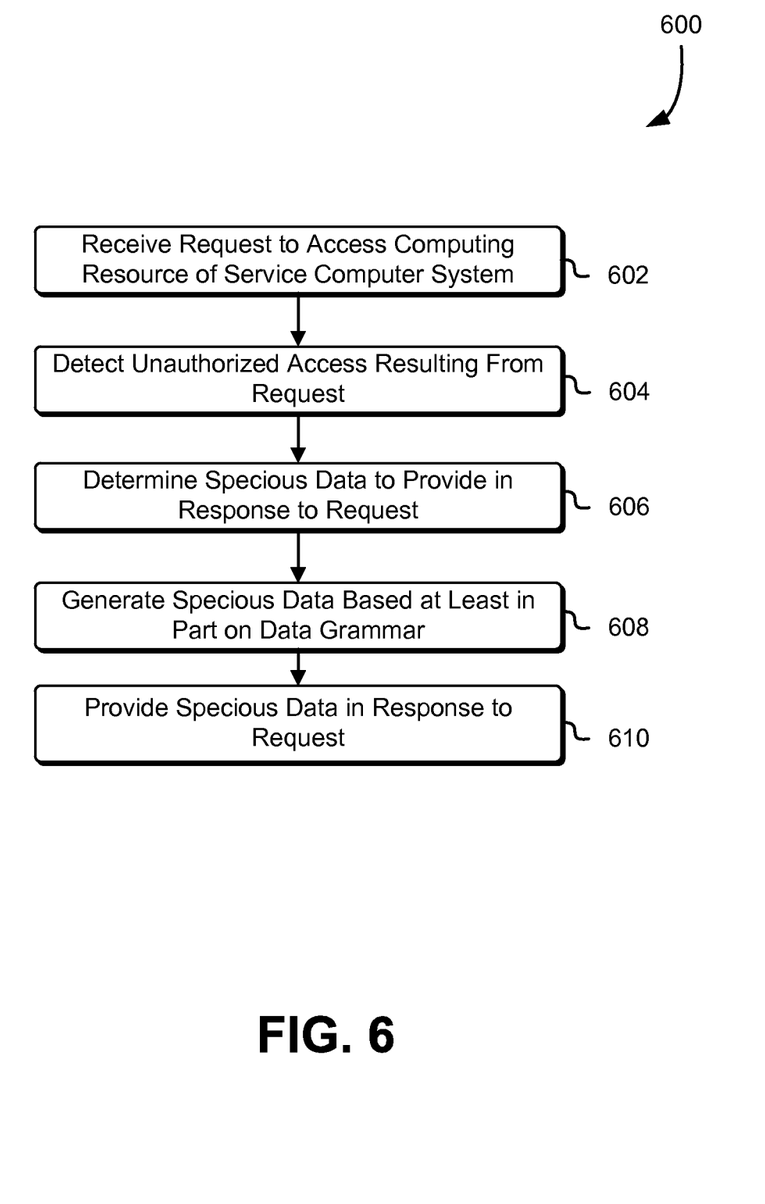
FIG. 6 show an example process for providing specious data in response to an unauthorized request to access data in accordance with an embodiment.

FIG. 6 show an example process 600 which may be used for providing specious data in response to an unauthorized request to access data in accordance with an embodiment. The process 600 may be performed by any suitable system, such as the service computer system described above in connection with FIGS. 2-4. Returning to FIG. 6, in an embodiment, the process 600 includes receiving a request to access computing resources of a service computer system 602. For example, the request may be a request for access to data generated by a virtual computer system implemented by a virtual computer system service as described above. The request may include a database query, API call, or other request. Furthermore, the request may be received at an interface of the service computer system or interface of the computing resource service provider. Upon receiving the request, a breach detection system may determine if the requested access resulting from the request is unauthorized 604.

The breach detection system may determine whether the request is unauthorized based on a variety of triggers. For example, authentication of the request may be successful, but the requested access may be unauthorized for the particular requestor based at least in part on a policy associated with the requested access and/or the user. In another example, authentication of the request may fail. Additionally, the breach detection system may determine the request is unauthorized based at least in part on request or component of the request. For example, the request may include a malformed query as described above. Returning to the process 600, the service computer system may then determine specious data to provide in response to the request 606. For example, if the request includes a query for credit card numbers from a database, the service computer system may determine to provide specious credit card numbers in response to the request. Additionally, the service computer system may determine various attributes of the requestor for use in determining the specious data to provide in response to the request. For example, if the query contains a misspelled element, the requestor may be a human operator and the specious data may be adjusted to appear more authentic to a human user. In another example, if the volume of the requests, the amount of information requested, or other factors indicate that the requestor is an automated agent, then the level of authenticity of the specious data may be reduced because the requestor is likely attempting to collect large amounts of data that would be difficult for a human to verify.

Returning to FIG. 6, the service computer system or component thereof, such as the specious data generation entity as described above, may then generate specious data according to a grammar 608. In numerous variations to the process 600, the specious data may be pre-generated based at least in part on the information maintained or generated by the service computer system. For example, if the service computer system maintains a set of customer addresses, a set of specious address may be pre-generated and stored by the service computer system or component thereof, such as the specious data generation entity. Additionally, the specious data may be obtained at least in part from publically available sources, such as DNS information, and modified to appear authentic as described above. The specious data may then be provided in response to the request 610. The response may include only specious data or may include only a portion of specious data. For example, if the breach detection system determines that the request has a 40% likelihood of being an attack, the service computer system may include specious and non-specious data in the response.

Figure 7:
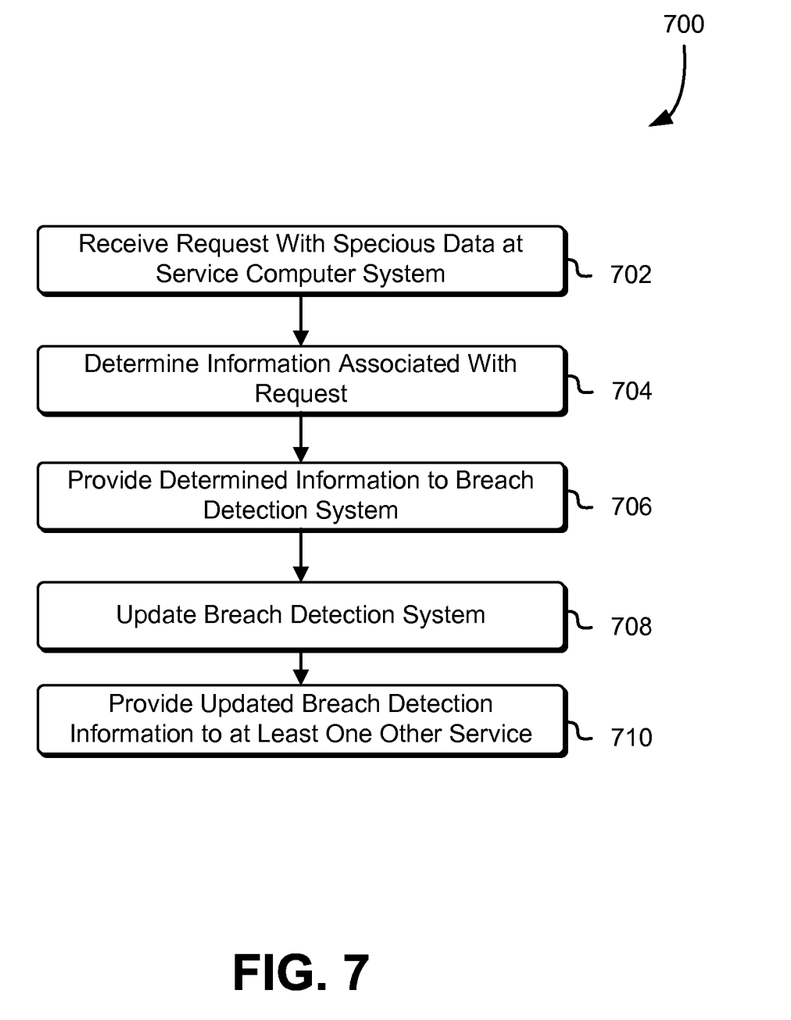
FIG. 7 show an example process for detecting specious data and updating a breach detection system in accordance with an embodiment.

FIG. 7 show an example process 700 which may be used for detecting specious data and updating a breach detection system in accordance with an embodiment. The process 700 may be performed by any suitable system, such as the service computer systems described above in connection with FIGS. 2-5. Returning to FIG. 7, in an embodiment, the process 700 includes receiving a request including specious data at a service computer system 702. The request may be received at an interface of the service computer system or computing resource service provider as described above. Additionally, a specious data detection entity may detect the specious data in IP or TCP packets as described above. The service computer system may then determine information associated with the request 704. The information may indicate a requestor or other identifying information associated with the request. The identifying information may be used to correlate attack activities across a plurality of computer systems.

Returning to FIG. 7, the identifying information obtained from the request may then be provided to a breach detection system 706. The breach detection system may receive information corresponding to a request that may be associated with an attack from a plurality of service computer systems, as described above in connection with FIG. 5. The breach detection system may then be updated 708 based at least in part on the received information. For example, a request including specious data may be received and an IP address of the requestor may be provided to the breach detection system, and as a result, the breach detection system may increase an attacker score associated with the IP address, where the attacker score indicates a likelihood that the IP address is associated with an attack on one or more service computer systems. Additionally, the update to the breach detection system may include placing the requestor on a black list, which may cause the service computer system to ignore request from the requestor. Once the breach detection system has been updated, the updated information may be provided to at least one other service computer system 710. In this way, an attacker's activity can be mitigated across a plurality of services.

Figure 8:
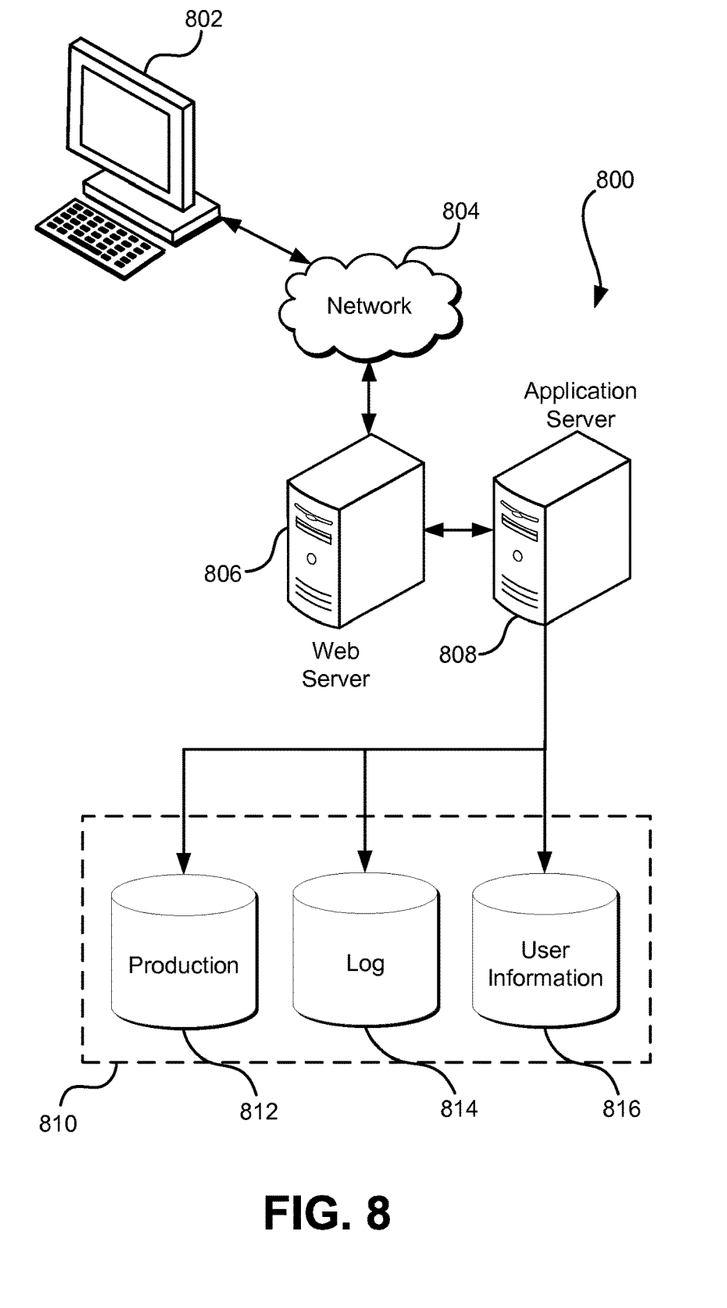
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
generating, based at least in part on a grammar associated with data maintained by a first service, a set of specious data based at least in part on the data, the data being customer data of a customer of the first service, where the grammar ensures that the specious data passes a validity check;
receiving, at an interface of the first service, a first request to obtain the data from the first service;
detecting a trigger indicative of the first request being part of an attack on the first service;
obtaining, based at least in part on the data indicated in the first request, specious data for a response to the first request from the set of specious data, where the specious data is detectable, by a second service, as being the specious data provided in response to the first request associated with the attack on the first service;
providing the specious data in response to the first request;
obtaining an indication that the specious data was received by the second service; and
providing the indication to a breach detection system.

2. The method of claim 1, wherein the trigger comprises successful completion of an authentication of the first request but that a requestor associated with the first request lacks privileges required to obtain data indicated in the request from the first service.

3. The method of claim 1, wherein the computer-implemented method further comprises:
detecting, at an interface of a second service, the specious data provided in response to the first request in a second request; and
providing the breach detection system with information associated with the second request.

4. The method of claim 1, wherein
at least a portion of the set of specious data was provided as specious data in response to a previous request.

5. A system, comprising:
one or more processors; and
memory with instructions that, if executed by the one or more processors, cause the system to:
generate a set of specious data based at least in part on a set of customer data objects containing information corresponding to customers of the computing resource service provider;
receive, at a first service operated by a computing resource service provider, a request for a data object, where the data object is a member of the set of customer data objects and contains a set of expected attributes;
detect a trigger indicative of the request being part of an attack on the first service;
obtain specious data corresponding to the data object from the set of specious data, where the specious data is generated to share at least a subset of the set expected attributes and detectable by at least a second service as provided in response to the request, the subset of the set of expected attributes selected to cause the specious data to satisfy a validity check;
provide the specious data in response to the request; and
obtain an indication that the specious data was received by the second service; and
provide the indication to a data loss prevention system.

6. The system of claim 5, wherein the specious data is further configured to be detectable as specious data provided by the first service in response to the attack.

7. The system of claim 6, wherein the memory further includes instructions that, when executed by the one or more processors, cause the system to detect specious data based at least in part on a homoglyph detected in the specious data.

8. The system of claim 5, wherein the specious data is provided by a customer of the first service, where the customer is associated with the data object and the specious data obtained from the customer corresponds to the data object.

9. The system of claim 5, wherein the instructions that cause the system to obtain specious data corresponding to the data object further include instructions that, when executed by the one or more processors, cause the system to:
translate a malformed query included in the request to a well-formed query; and
obtain data responsive to the well-formed query.

10. The system of claim 5, wherein the memory further includes instructions that, when executed by the one or more processors, cause the system to:
monitor, for an interval of time, a set of requests received at the first service for one or more attributes of the set of requests;
determine a set of acceptable requests based at least in part on the set of requests, where the set of acceptable request included at least one attribute of the one or more attributes; and
wherein the trigger further includes the request not being a member of the set of acceptable requests.

11. The system of claim 10, wherein the one or more attributes of the requests includes at least one of:
a time associated with a particular request of the set of requests,
a volume associated with the set of requests,
customers associated with the set of requests,
a frequency associated with the set of requests, or an amount of data returned in response to the set of request.

12. The system of claim 5, wherein the memory further includes instructions that, when executed by the one or more processors, cause the system to:
provide information corresponding to the attack and the request to the data loss prevention system; and
determine additional information corresponding to the attack by at least correlating the information with other information corresponding to the attack obtained from at least one other service.

13. A non-transitory computer-readable storage medium having stored thereon executable instructions that, if executed by one or more processors of a computer system, cause the computer system to:
receive, at an interface of the computer system, a first request for data maintained by the computer system;
detect a violation of one or more policies indicative of the request being detrimental to an entity associated with the data maintained by the computer system;
generate specious data corresponding to data maintained by the computer system, where the specious data is generated based at least in part on a grammar defining one or more attributes of the data maintained by the computer system, where the specious data passes a validity check as a result of being generated based at least in part on the grammar;
in response to the first request:
delay for an amount of time; and
provide the specious data; and
obtain an indication that the specious data was received by another computer system; and
provide the indication to a breach detection system.

14. The non-transitory computer-readable storage medium of claim 13, wherein the executable instructions that cause the computer system to generate specious data further include executable instructions that cause the computer system to generate specious data such that use of the specious data by a requestor responsible for the first request is detectable by the computer system.

15. The non-transitory computer-readable storage medium of claim 14, wherein the executable instructions further comprise instructions that, if executed by the one or more processors, cause the computer system to detect the specious data included in a second request received at the interface of the computer system.

16. The non-transitory computer-readable storage medium of claim 15, wherein the executable instructions further comprise instructions that, if executed by the one or more processors, cause the computer system to:
provide information associated with the first request and the second request to the breach detection system, as a result of detecting the specious data included in the second request; and
receive, from the breach detection system, an update to the one or more policies based at least in part on the information, the update to the one or more policies causing the computer system to ignore requests received from a requestor associated with the first request or the second request.

17. The non-transitory computer-readable storage medium of claim 13, wherein the executable instructions further comprise instructions that, if executed by the one or more processors, cause the computer system to generate a grammar based at least in part on the data maintained by the computer system, where the grammar indicates a set of rules for generating the specious data.

18. The non-transitory computer-readable storage medium of claim 13, wherein the executable instructions that cause the computer system to detect the violation of the one or more policies further include executable instructions that cause the computer system to determine that an authentication of the first request completed successfully and a requestor associated with the first request is not authorized to access at least a portion of the data maintained by the computer system.

19. The non-transitory computer-readable storage medium of claim 13, wherein the executable instructions that cause the computer system to generate specious data further include executable instructions that cause the computer system to generate specious data such that the specious data is configured to satisfy a set validity checks.

\* \* \* \* \*